CLIP FORMING AND FASTENING DEVICE

Filed Sept. 6, 1957 9 Sheets-Sheet 1

INVENTORS
MARVIN SMALL
STEPHEN L. JAVNA
HAROLD J. BUSH
EDWARD G. GRIFFITHS

BY

Morgan, Finnegan, Durham & Pine
ATTORNEYS

CLIP FORMING AND FASTENING DEVICE

Filed Sept. 6, 1957 9 Sheets-Sheet 2

INVENTORS
MARVIN SMALL
STEPHEN L. JAVNA
HAROLD J. BUSH
EDWARD G. GRIFFITHS

BY

Morgan, Finnegan, Durham & Pine

ATTORNEYS

CLIP FORMING AND FASTENING DEVICE

Filed Sept. 6, 1957 9 Sheets-Sheet 3

INVENTORS
MARVIN SMALL
STEPHEN L. JAVNA
HAROLD J. BUSH
EDWARD G. GRIFFITHS

BY

Morgan, Finnegan, Durham & Pine
ATTORNEYS

CLIP FORMING AND FASTENING DEVICE

Filed Sept. 6, 1957

INVENTORS
MARVIN SMALL
STEPHEN L. JAVNA
HAROLD J. BUSH
EDWARD G. GRIFFITHS

BY

Morgan, Finnegan, Durham & Pine

ATTORNEYS

CLIP FORMING AND FASTENING DEVICE

Filed Sept. 6, 1957 9 Sheets-Sheet 5

INVENTORS
MARVIN SMALL
STEPHEN L. JAVNA
HAROLD J. BUSH
EDWARD G. GRIFFITHS

BY

Morgan, Finnegan, Durham & Pine
ATTORNEYS

CLIP FORMING AND FASTENING DEVICE

INVENTORS
MARVIN SMALL
STEPHEN L. JAVNA
HAROLD J. BUSH
EDWARD G. GRIFFITHS
BY
Morgan, Finnegan, Durham & Pine
ATTORNEYS INVENTORS
MARVIN SMALL
STEPHEN L. JAVNA
HAROLD J. BUSH
EDWARD G. GRIFFITHS
BY
Morgan, Finnegan, Durham & Pine
ATTORNEYS Dec. 31, 1963 M. SMALL ETAL 3,115,904

CLIP FORMING AND FASTENING DEVICE

Filed Sept. 6, 1957 9 Sheets-Sheet 8

CLIP FORMING AND FASTENING DEVICE

Filed Sept. 6, 1957 9 Sheets-Sheet 9

INVENTORS
MARVIN SMALL
STEPHEN L. JAVNA
HAROLD J. BUSH
EDWARD G. GRIFFITHS
BY
Morgan, Finnegan, Durham & Pine
ATTORNEYS 3,115,904
Patented Dec. 31, 1963

3,115,904

CLIP FORMING AND FASTENING DEVICE

Marvin Small, 544 E. 86th St., New York, N.Y., Stephen L. Javna, 33 Edgewood St., Tenafly, N.J., and Harold J. Bush, Clifton, and Edward G. Griffiths, Maywood, N.J., assignors, by mesne assignments, to said Marvin Small and said Stephen L. Javna Filed Sept. 6, 1957, Ser. No. 682,490
26 Claims. (Cl. 140—93)

The invention relates to fastening devices and more particularly to fastening devices of the so called "clip" type in which a plurality of articles are fastened together by means of a clip which bears against the upper surface of the top articles and the under surface of the lowermost article without puncturing the articles.

This application is a continuation-in-part application of our co-pending application Serial No. 562,114, filed January 30, 1956, now abandoned.

The invention has for one of its objects a fastening device that will form a clip fastener from any suitable clip material, such as wire rods or the like, and also apply the formed clip onto the articles to be fastened together. A further object of the invention is to completely accomplish the aforementioned objective with a device actuated by a simple, easily executed physical movement of the operator. Another object of the invention is to actually form the clip about the articles to be fastened together so that proper tension on the articles is achieved regardless of variations in the number or thickness of the articles. It is also an object of the invention to provide a fastening device with a storage container for the clip material which will be capable of receiving and storing the clip material in a natural and simple manner as it emerges from the manufacturing process without requiring any additional preparation for packaging. Still another object of the invention is to provide a fastening device with a storage container for the clip material that will store the material in a manner to reduce the resistance to the feeding of the material to the device. Another object of the invention is to provide such a storage container which will guard against the accidental rupture of the clip material while in the container and one that will prevent retraction of the material into the storage container after having once reached the feeding apparatus for the fastening device. A further object of the invention is to provide a storage container for clip material that will hold a large quantity of material in a compact manner and which will present a low silhouette when attached to the fastening device.

Other objects and advantages of the invention will be set forth hereinafter or will be obvious from the description of the applicant's invention.

Briefly and in general, the invention comprises a mandrel and a movable forming tool adapted to engage a length of clip material positioned adjacent the mandrel and to bend the length of clip material around the mandrel to form a clip fastener. Means are provided to laterally move the clip after the completion of the clip-forming stroke of the tool, so as to apply the clip to the articles to be fastened together which are held in receiving means located adjacent the mandrel. In the formation of the clip one end of the length of clip material passes over the uppermost article while the opposite end of the clip material passes under the lowermost article thereby forming the clip according to the number and thickness of the particular group of articles being fastened together at the time.

In one form of the invention the mandrel is laterally movable and is secured to a laterally slidable plate mounted on a base member while the forming tool is preferably secured to another plate pivotally connected to the slidable mandrel plate. This arrangement permits lateral movement of both the forming tool and the mandrel with respect to the base and pivotal movement of the tool with respect to the mandrel. Pivotal movement of the forming tool and lateral movement of the mandrel plate is effected through a lever arm pivotally secured to the base and connected to the tool plate by a connecting link. Downward pivotal movement of the lever arm also actuates clamping means which hold the articles against movement on the receiving means. Suitable storage means for the clip material is provided on the device and also a feeding mechanism whereby lengths of clip material may be fed one at a time to a feeding plate which advances and positions each length of material adjacent the mandrel. Preferably, this mechanism comprises means for positively feeding lengths of material through the tool plate into a movable feeding plate which slidably engages the tool plate and moves forwardly with respect thereto as the tool plate pivots downwardly toward the mandrel.

The forming tool is provided with inwardly turned and angled cam surfaces which successively engage and bend the lengths of clip materials around the mandrel so as to form a suitable clip fastener. In preferred form described and illustrated hereinafter the clip material is bent to form a clip with crossed legs but it is to be understood that any desired shape of the clip could be obtained according to the shape and character of the cam surfaces on the forming tool. If necessary, more than one bending operation could be carried out before the clip is inserted onto the articles. To obtain the proper tension in the clip for each group of articles, regardless of their number or thickness, the article-receiving means are positioned adjacent the mandrel and adapted to hold the articles at an angle with respect to the plane of the clip so that as the clip is formed a portion of one leg passes over the uppermost article while a portion of the opposite leg passes under the lowermost article.

During the first part, or the clip-forming portion, of the actuating stroke of the lever the mandrel plate is held against movement by stop means but, after the clip has been formed with the end portions of the legs extending slightly over the edge of the articles, releasing means on the tool plate engage and release the stop means. Further downward movement of the lever arm causes the mandrel and tool plates to move toward the articles thereby fully applying the clip to the articles, said clip being released from the mandrel by reason of mandrel-retracting means on the tool plate which withdraw the mandrel from within the clip and permit the tool plate to push the clip onto the articles. Upon release of the actuating lever the tool and mandrel assembly returns to its original position, another length of clip material is fed to the feeding plate and the device is ready to repeat its operation.

The storage container for the fastening device generally comprises a substantially rectangular casing open at the top but adapted to receive a cover. At one end the container is provided with a pair of transverse, substantially parallel walls that together define a narrow passageway through which the lengths of clip material—adhesively joined together—pass to the feeding mechanism. Intermediate of this passageway and the rectangular storage area the container is formed with a gradually curved surface so that the clip material lying in the container in layer-upon-layer relationship may pass to the passageway without engaging any sharp surfaces. Additionally, one wall of the passageway, adjacent the bottom thereof, is bent inwardly at an angle to decrease the width of the passageway at that point to slightly less than the thickness of the clip material. Downward passage of the material, therefore, causes the inwardly bent portion to be distended to permit the feeding of the stock to the fastening device but any upward retraction of the material causes the inwardly bent portion to move further inwardly to jam against the material and prevent any further upward movement.

In a simpler form of construction the apparatus is provided with a laterally movable feeding means, a downwardly acting forming tool and supporting structure and a laterally movable base for the mandrel. Suitable side plates—preferably parallelly disposed—are positioned on either side of the members and grooves are cut into the face of each side plate in order to receive and confine suitable extensions on the members to limit the movement thereof only as aforementioned. Additionally, the feeding means and the downwardly movable forming tool are so connected to a pivotable actuating member or lever arm that pivotable movement of the lever arm results in lateral movement of the feeding means so as to place a length of clip material adjacent the mandrel, downward movement of the forming tool to bend the length of clip material around the mandrel to form a clip and lateral movement of the mandrel base after the clip has been formed to insert the clip fully on to the articles to be fastened together. In this embodiment the container for the clip material is positioned adjacent the mandrel and access thereto is had through a suitable opening in the base of the apparatus. Projections are provided on the container which extend adjacent the mandrel and a cover, provided with similar projections, overlies the container so that both the projections on the container and on the cover are adjacent each other. Both projections have suitably formed teeth between which the clip material may lie and by which the length of clip material may be advanced one by one upon reciprocal movement between the cover and the container.

It will be understood that the foregoing brief description and the following detailed description as well are exemplary and explanatory of the invention but are not restrictive thereof.

Figure 1:
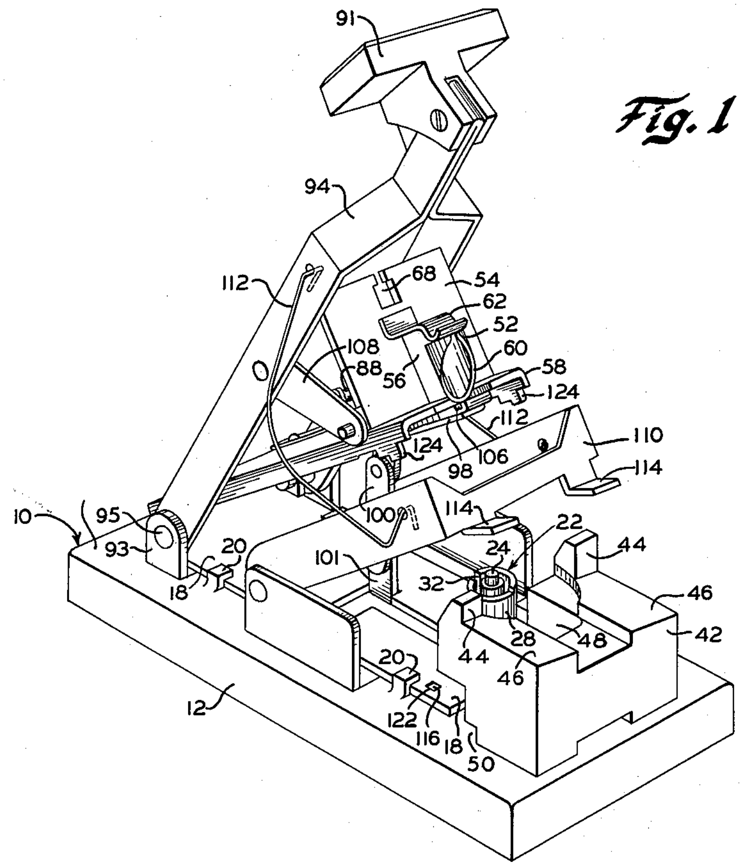
FIG. 1 is a perspective view of a preferred embodiment of the applicants' invention.
Figure 2:
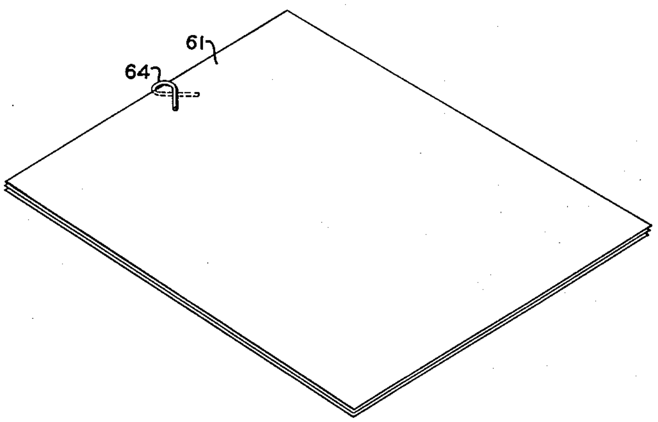
FIG. 2 is a perspective view showing a clip fastener after it has been applied to a plurality of papers by the applicants' device.

For the purpose of illustrating the principles of the invention there is shown in the drawings two preferred embodiments of the applicants' device adapted to form and insert a clip fastener onto a plurality of paper sheets. It is to be understood, however, that the device may be used for any other application in which two or more articles are to be joined together. For instance, the device could be used for fastening tags to garments, for holding men's shirts together, for sealing bags and for any other fastening operation where it is important that the articles to be joined not be marked or punctured. The applicants, therefore, do not wish to restrict their invention to the particular application shown and described herein but intend to be limited only by the scope of the appended claims.

Referring at first to FIG. 1, there is shown a preferred embodiment of the invention adapted to clip papers together for office use. While this embodiment is manually actuated the principles of the invention could just as easily be applied to power operated devices. The device is mounted upon a base 10 of generally rectangular form which may advantageously be formed from sheet stock having its edges bent over and welded to form sides 12 so as to provide space between the top 14 of the base and any suitable supporting surface to accommodate certain elements of the device as described hereinafter. On its upper surface 14 the base 10 carries a laterally movable plate 18 which forms a foundation for the mandrel and forming tool mechanisms that form the clips from wire rod, or any other suitable material, the plate 18 being slidably retained on the base 10 by the lugs 20.

The mandrel assembly 22 comprises a vertically movable mandrel 24 slidably mounted in a stationary mandrel guide 26 and a mandrel housing 28 spaced around the guide so as to form a space 30 therebetween. Preferably, the mandrel guide 26 and housing 28 are generally circular in shape but may be formed in any other shape as desired as long as sufficient space is provided to accommodate the forming tool 52 between them. A vertical slot 32 is provided in the mandrel housing 28 and accommodates a vertically slidable post 34 (FIG. 3) which is connected to the movable mandrel 24 underneath the surface 14 of the base 10 so as to be movable therewith. A spring 36 on the under side of the mandrel plate 18 constantly urges the post 34 and the mandrel upwardly. The upper edge 38 of the mandrel housing 28 is provided with a step 40, the purpose of which will be pointed out hereinafter.

A substantially rectangular block 42 is provided at one end of the base 10 and adapted to receive the articles to be fastened together. For this purpose the block 42 is provided with a pair of stops 44 at the inner end thereof against which the articles are aligned. The upper surfaces 46 of the block, upon which the articles rest, are inclined at an angle with the horizontal plane of the formed clip so that as the clip is formed one end of the clip may pass over the top of the articles while the other end passes under the articles. A recess 48 is also provided in the inner end of the block 42 to permit the mandrel housing 28 to move inwardly toward the stops 44 on the block and other suitable recesses 50 are provided at the bottom of the block to accommodate the inner portion of the mandrel plate 18 as it moves inwardly on the clip-inserting operation.

The forming tool 52 for the apparatus is secured to a support 54 by means of a web 56 and the support is mounted at right angles on a tool supporting plate 58 that is pivotally connected to the mandrel plate 18 through the brackets 59, stud shafts 61 and brackets 63. Preferably, the forming tool 52 is constructed with a generally circular cross-section and the lower and outer edge 60 of the forming tool makes an angle of approximately 45° with respect to the support so as to provide curved inwardly turned cam surfaces on the tool. The tool 52 is positioned so that pivotal movement of the tool plate 58 will bring the forming tool into engagement with a wire rod 64 placed across the upper edges 38, 39 of the mandrel guide and mandrel housing during this clip-forming stroke as will be described hereinafter. A spring 62 is provided adjacent the top of the forming tool so as to prevent the wire rod from passing over the top of the mandrel during the clip forming operation and to hold the clip on the mandrel assembly after the mandrel has been withdrawn.

The wire rods 64, from which the clips are formed, are stored in a substantially rectangular casing or container 66 mounted in an opening 68 in the tool support 54 by means of a suitably formed extension or lug 70. Preferably the rods 64 are adhesively secured together in the form of a belt and are placed in the interior of the container 66 in overlapping, layer upon layer relationship just as they emerge from the manufacturing process. The container is provided at one end with a curved projection 74 adjacent a narrow passageway 76 formed by two substantially parallel walls 78, 79, this passageway 76 being adapted to extend downwardly into a similar passageway 80 formed between the tool support 54 and a parallel second support member 82 secured to the tool plate 58. The wire rods 64 pass over the curved projection 74 and through the passageways 76, 80. A correspondingly shaped slot-like opening 84 is provided in the tool plate 58 adjacent the end of the passageway 80 to enable the wire rods 64 to pass to the underside of the plate.

The wire rods are positively fed downwardly through the passageway 80 by a pair of ratchet wheels 86 mounted on a shaft 88 journalled in the second support member 82. Each wheel extends inwardly of the passageway 80 to engage the rods 64 and the teeth are adapted to fit the diameter of the wire rod being used. Movement of the wheels is effected by a pawl 90 pivotably mounted on an arm 89 which is fixed to the shaft 88 for the ratchet wheels. The pawl 90 is constantly urged into engagement with the teeth of one of the ratchet wheels 86 by a light spring 87. Movement of the pawl 90 from one tooth to another of the ratchet wheel 86 is effected by a pin 92, on connecting link 109 pivotally mounted on lever arm 94, which bears against the arm 89. As the lever arm 94 is moved downwardly the arm 89 is depressed against the resistance of spring 97 and because the ratchet wheels 86 are prevented from reverse rotation by the belt of clips, this depression withdraws pawl 90 against the tension of the light spring 87 from its original tooth and places in the next tooth. Upward movement of the arm 89 thereafter causes the pawl 90 to rotate the ratchet wheels 86 the required amount to feed another wire rod 64 to the feed plate 96.

To prevent the wire rods from accidentally retracting upwardly in the passageway 76 the container 66 is provided with a tongue portion 128 formed between the access openings 132 for the ratchet wheels and at a slight angle with respect to the wall 78 so as to extend slightly inwardly of the passageway 76. The width of the passageway 76 at this point is thereby made somewhat less than the diameter of the rods so that as the rods are fed downwardly the tongue 128 is sprung outwardly. Should the belt of pins try to move upwardly the tongue 128 will be moved inwardly and the end thereof will jam between a pair of adjacent pins thus preventing any further upward movement of the pins.

The feed plate 96 is preferably located at the underside of the tool plate 58 and is adapted to be in slidable engagement therewith. To this end the feed plate 96 is mounted within a pair of runners 98 depending from the tool plate and is pivotally connected to the mandrel plate 18 at a point spaced from the pivotal connection between the mandrel plate and the tool plate. Accordingly, the feed plate 96 on its underside, is provided with a bracket 99 to which is attached a link 100 having its opposite end secured to a bracket 101 on the mandrel plate 18. Downward movement of the tool plate 58, therefore, moves the feed plate 96 downwardly and, at the same time, forwardly with respect to the tool plate.

The outer end of the feed plate 96 is divided into two arms 102 by a recess 104 shaped to correspond to and fit around the mandrel housing 28 and a slot or groove 106 is formed across the outer end portions of each of these arms to receive a single wire rod 64. As the feed plate 96 is moved forwardly with respect to the tool plate 58 the lowermost wire rod 64 in the passageway 80 is moved downwardly by the ratchet wheels 86, through the opening 84 in the tool plate 58 and into the groove 106 in the end portions 102 of the feed plate which shears it off from the belt of rods. Further pivotal movement of the tool plate and feed plate advances the feed plate to a point where the arms 102 are adjacent the mandrel housing 28 and further downward movement of the feed plate causes the wire rod to engage the upper edges 38, 39 of the mandrel housing and to be deposited adjacent the mandrel.

Pivotal movement of the feed plate and the tool plate is effected by means of the lever arm 94, which is pivotally mounted on the base 10 on pins 95 (FIG. 1) journalled in the brackets 93, and by connecting links 108 and 109 which are pivotally connected between the lever arm 94 and the tool plate 58. Additionally, the apparatus is provided with another lever arm 110 which is pivotally connected to the base 10 and spaced from the lever arm by suitable spring means 112. Lever arm 110 is also provided with a pair of legs 114 adapted to move downwardly to engage and press the articles being fastened together against the upper surface 46 of the block 42 to hold the articles in a stationary position.

The mandrel plate 18 is held against lateral movement by stop means which, in the preferred embodiment, comprise a pair of detent members 116. Under the urging of a spring 118 mounted on the underside of the surface 14 of the base 10 the detent members 116 extend upwardly through openings 120 in the base so as to engage correspondings openings 122 in the plate. In order to release the mandrel plate for lateral movement at the completion of the clip-forming stroke the tool plate carries a pair of extensions 124 which engage and depress the detent members 116 from the openings 120 in the mandrel plate. Once the mandrel plate is free to slide with respect to the base further downward movement of the lever arm 94 causes the mandrel plate 18 to slide forwardly toward the block 42.

Figures 3, 4:
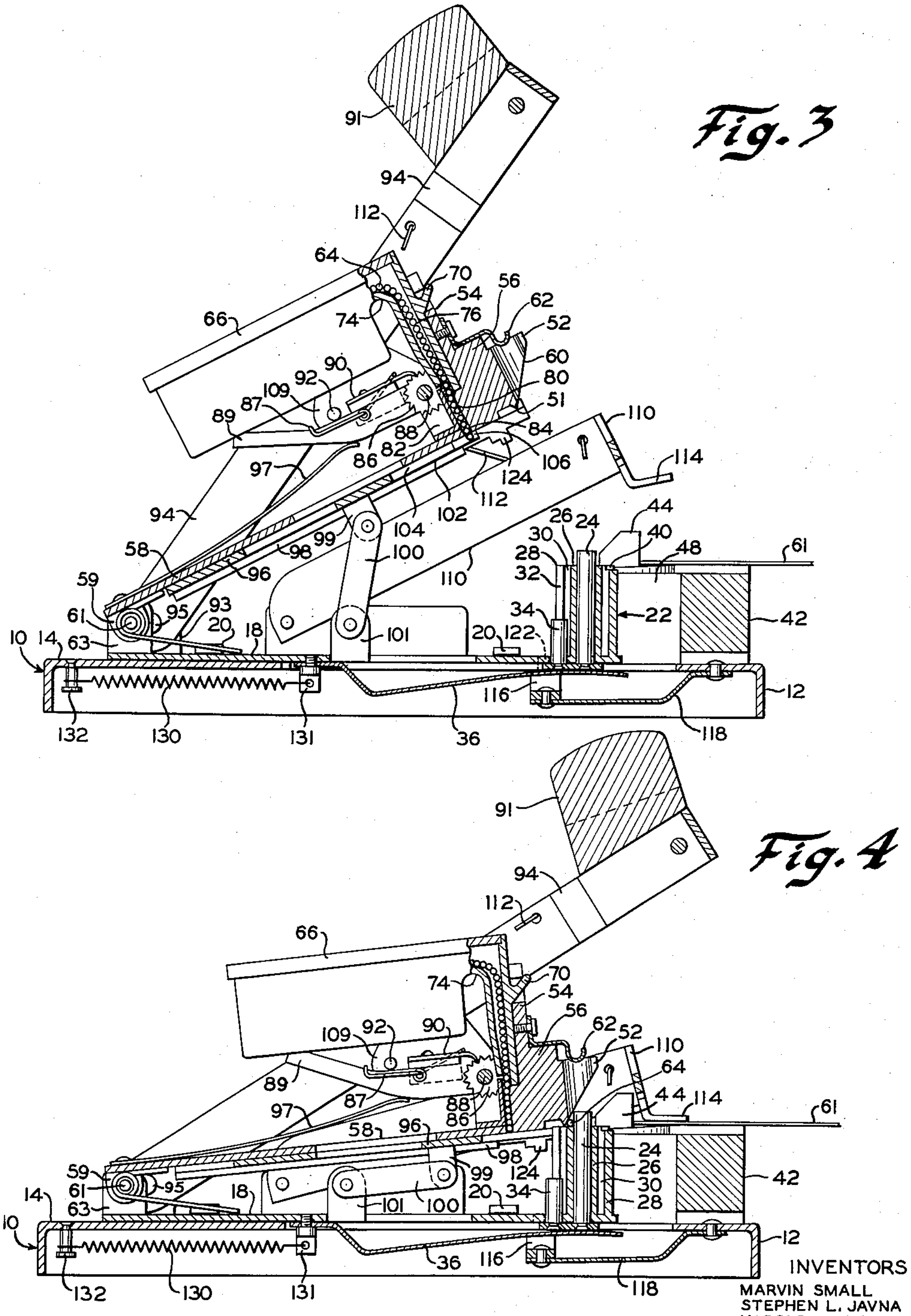
FIG. 3 is a side elevation, partly in section, showing the applicants' device in its non-operative position.
FIGS. 4, 5 and 6 are views similar to that of FIG. 3 showing the device in successive positions during the operation of the device.
Figure 9:
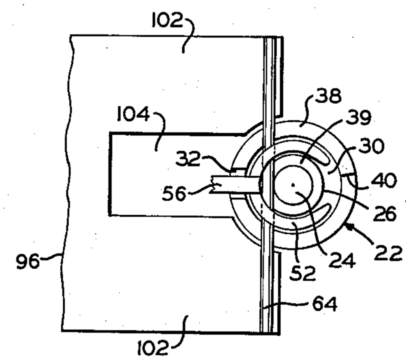
FIGS. 9, 10 and 11 are plan views showing successive operations during the formation of the clip.
Figure 10:
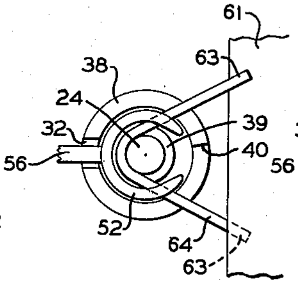

Reference will now be had to FIGS. 3–6 for a detailed explanation of the operation of the apparatus. In FIG. 3 the apparatus is shown in a starting or non-operative position and the articles to be fastened together are placed on the block 42 and pushed against the stops 44 mounted thereon. The belt of wire rods 64 in the passageway 80 between the supports 82, 54 has been moved downwardly by the ratchet wheels 86 so that one wire rod has passed completely through the slot 84 in the tool plate and extends downwardly into the groove 106 in the feeding plate 96. As the handle 91 on the lever arm 94 is pushed downwardly the feeding plate 96 is moved forwardly with respect to the tool plate 58 and in doing so shears the bottom wire rod 64 from the belt. As the tool plate moves downwardly the feeding plate continues to move forwardly until it is in a position directly above the assembly housing 22. Further downward movement of the tool plate and feeding plate results in the wire rod being deposited across the upper edges 38, 39 of the mandrel housing at a point immediately adjacent the mandrel 24 itself. At the same time, the clamping lever 110 is moved downwardly to engage the paper and to hold it firmly against the upper surfaces 46 of the block 42. At the point shown in FIG. 4 the forming tool 52 has just begun to engage the wire rod 64, this position being the same as that shown in FIG. 9. It will be noted that the inner edge 60 of the forming tool 52 engages the side of the wire rod 64 opposite to that of the mandrel and, due to the inclined surface of the face of the forming tool, firmly wedges the wire rod against the mandrel.

Figure 11:
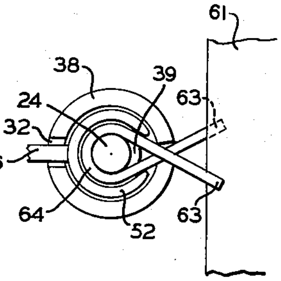
Figure 12:
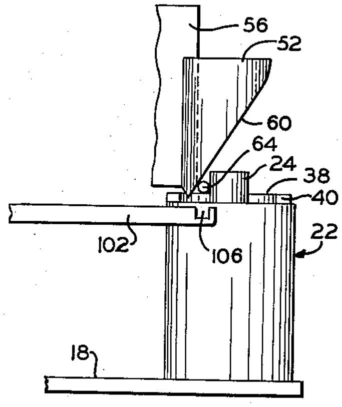
FIGS. 12, 13 and 14 are side elevational views corresponding to FIGS. 9, 10 and 11.
Figures 13, 14:
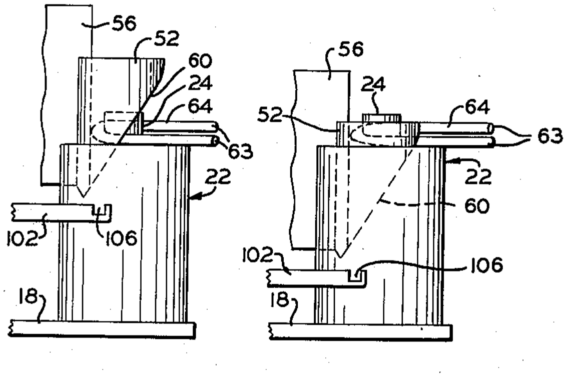
Figure 15:
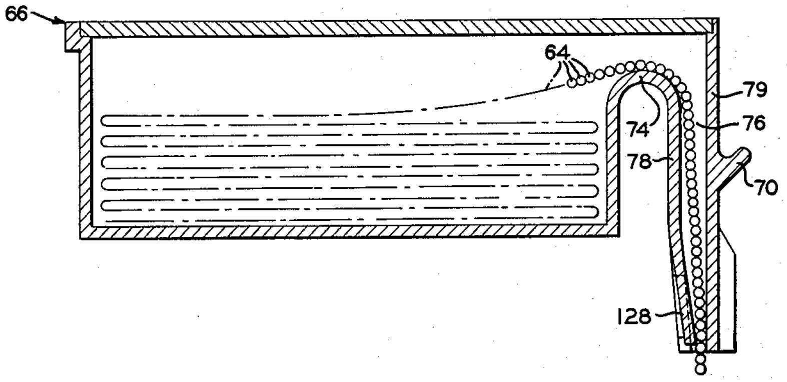
FIG. 15 is a side elevational view in section of a preferred embodiment of a storage container for a fastening device showing the manner of storing the wire stock therein.
Figure 17:
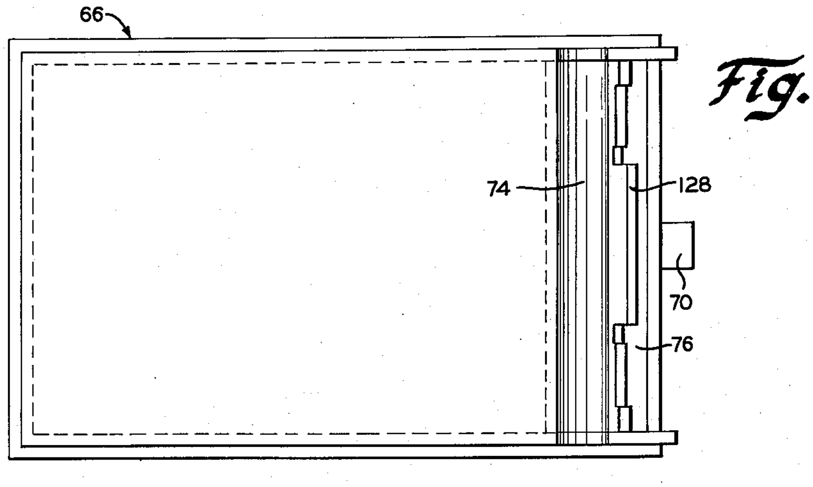
FIG. 17 is a bottom plan view of the container.
Figure 16:
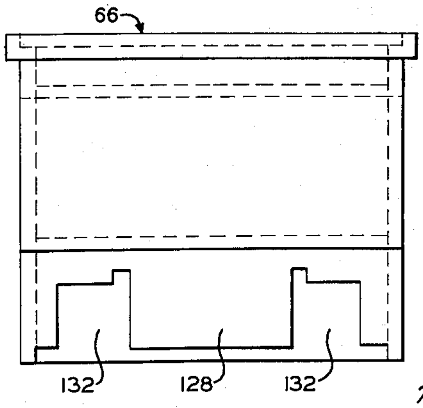
FIG. 16 is a front elevation of the storage container of FIG. 15.
Figure 18:
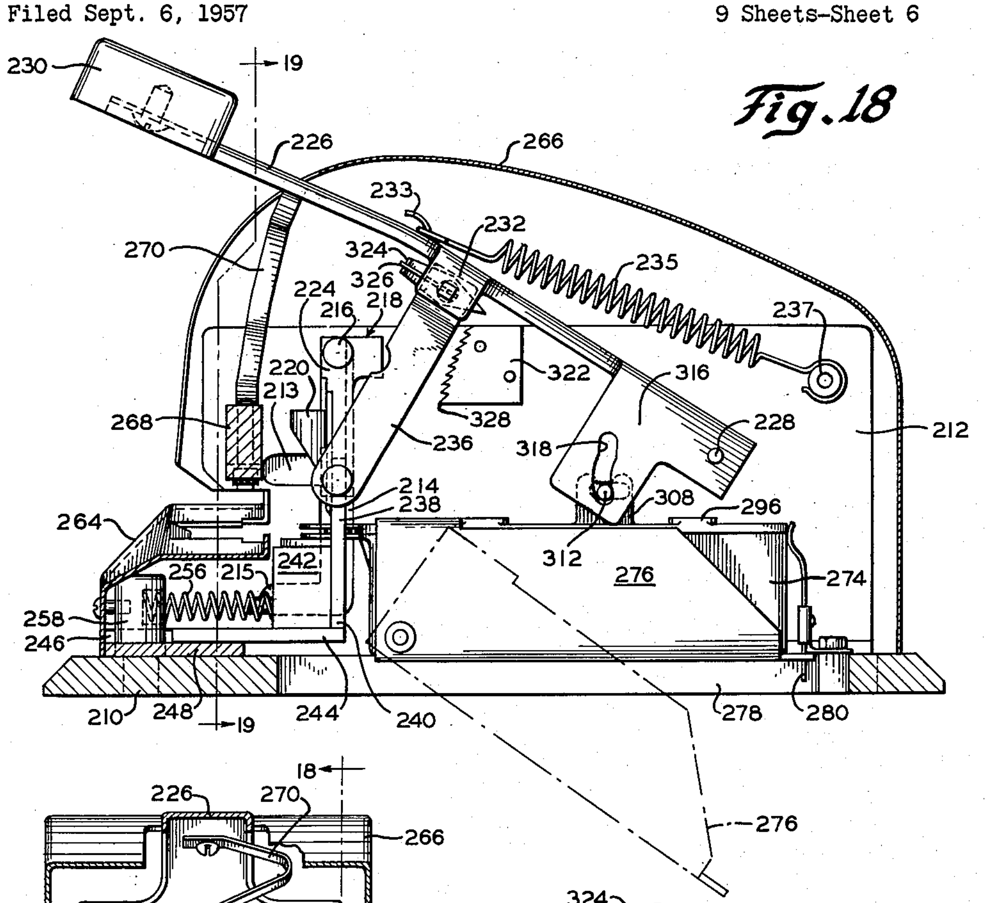
FIG. 18 is a side elevational view, partly in section of a second embodiment of the invention taken along the line 18—18 in FIG. 19 looking in the direction of the arrows.
Figure 19:
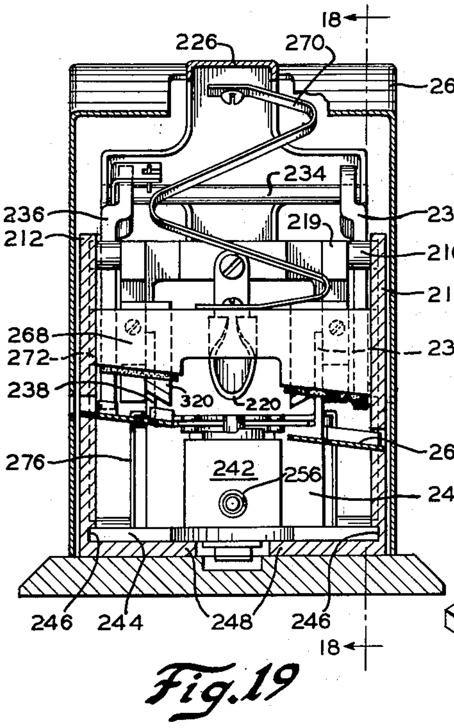
FIG. 19 is a transverse sectional view taken along the line 19—19 in FIG. 18 looking in the direction of the arrows.
Figure 20:
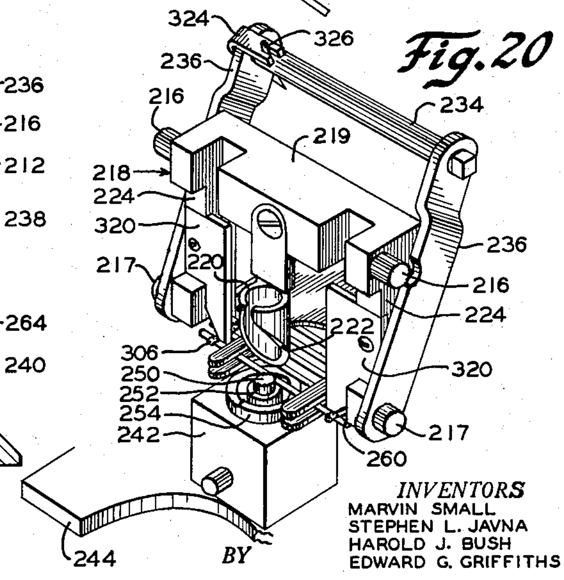
FIG. 20 is a perspective of the supporting structure for the forming tool and the mandrel assembly.

As the lever arm 94 continues to be pushed downwardly the forming tool 52 enters the annular space 30 between the mandrel guide 26 and the mandrel housing 28. Movement of the tool downwardly into the mandrel housing causes the angular surface 60 of the face of the forming tool to progressively bend the wire rod around the mandrel and the inwardly turned outer surfaces of the forming tool result in the crossing of the ends of the wire rods to form a clip as shown in FIG. 11. In order to facilitate the passage of one end of the wire rod over the other the upper edge 38 of the mandrel housing 28 is provided with a step 40 that guides one end over the other.

It will be noted that the inner edges of the articles 61 being fastened are positioned by the stop means 44 on the block 42 adjacent the mandrel housing 22 so that in the formation of the clip the end portions 63 of the clip 64 extend beyond the edge of the articles. Due to the inclination of the surfaces 46 on the block 42 one end of the wire rod passes over the top of the articles while the other end of the wire rod passes underneath the articles. In this manner each clip is always formed on the articles being fastened and hence, always corresponds to the thickness of the particular group of articles being fastened.

Figure 5:
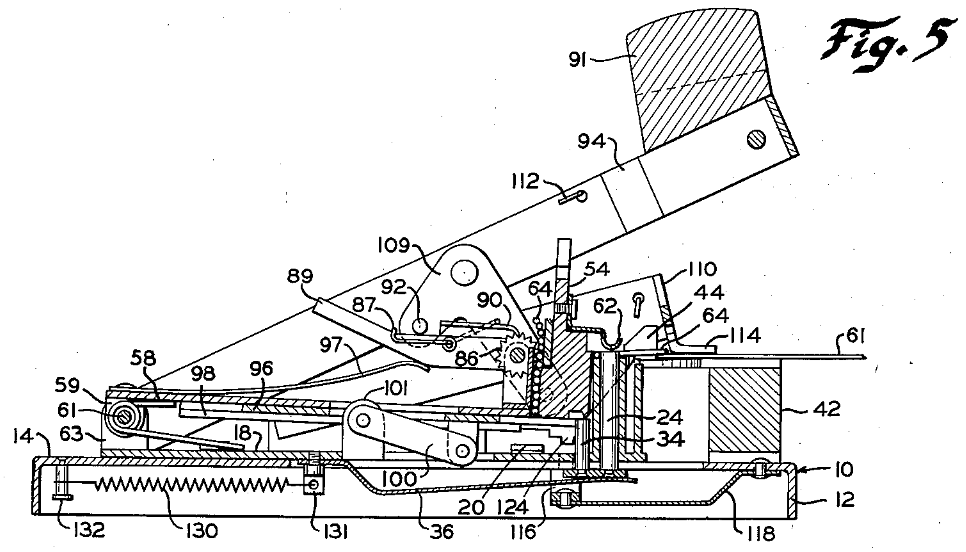
Figure 6:
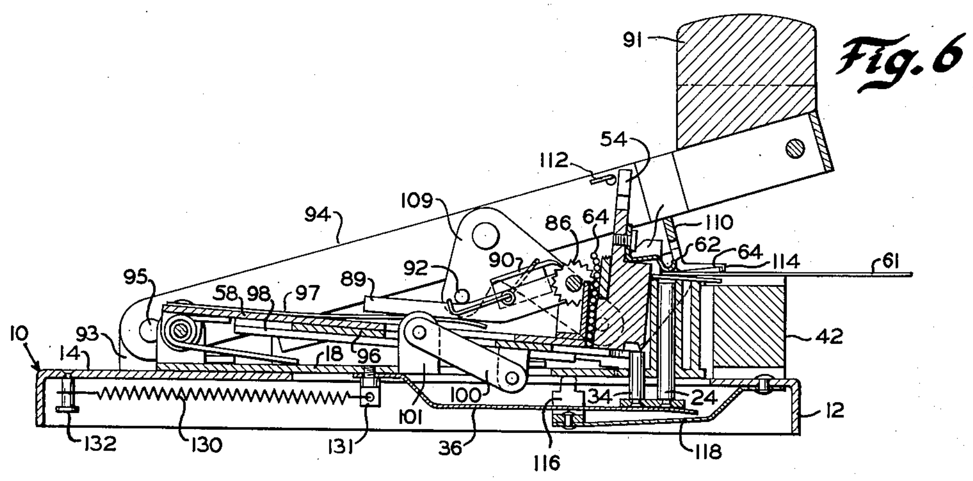
Figure 7:
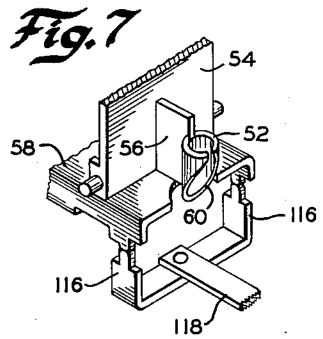
FIG. 7 is a perspective view of a portion of the device showing the stop-releasing means.
Figure 8:
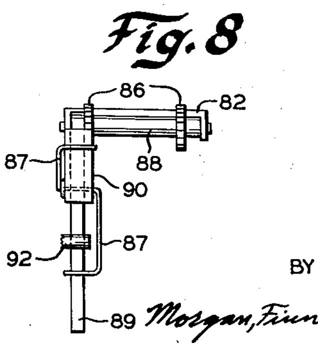
FIG. 8 is a plan view of a portion of the device showing the wire feeding means.

In FIG. 5 the device is shown at the end of the clip-forming stroke in which the clip has been completely formed about the articles being fastened. Further downward movement of the lever arm results in the complete insertion of the clip onto the articles and this condition is shown in FIG. 6. The mandrel plate 18 is held against lateral movement with respect to the base 10 by detents or stop means 116 which extend upwardly from the base. The projections 124 on the tool plate 58 engage the detents 116 in the openings 120 in the mandrel plate 18 after the clip has been completely formed thereby forcing the detents downwardly through the openings in the mandrel plate. Once the detents are removed, further movement to the lever arm 94 forces the mandrel plate 18 and mandrel assembly 22 to move laterally toward the articles 61. Immediately prior to the releasing of the detent means the lower end 51 of the forming tool 52 engages the movable pin 34 mounted in the slot 32 in the mandrel housing 28. As the forming tool continues downwardly it depresses this pin and the mandrel 26 to which it is connected, against the tension of the spring 36 thereby enabling the clip to be removed from the mandrel housing. The mandrel plate 18 and mandrel assembly 22, together with the feeding plate 96 and tool plate 58, then move laterally with respect to the lever arm 94 and base 10 to completely insert the clip 64 onto the articles 61 being fastened. When the lever arm 94 is released a spring 130, secured between a post 131, on the mandrel plate 18 and another post 132 on the base 10, returns the mandrel plate to its original position and also the feeding means, tool plate and lever arm.

As the lever arm is released the pawl 90 is once again permitted to engage the ratchet wheel 86 and as the lever arm 94 moves upwardly the pawl rotates the ratchet wheels to feed another wire rod to the feed plate, thus placing the device in condition for a repetition of the operating cycle.

Another preferred form of the invention is shown in FIGS. 18–33. In this form of the invention the base 210 is formed from solid stock and is provided with a pair of parallelly disposed side plates 212. Each side plate 212 constitutes guide means and has cam tracks 213, 214, 215 cut into the face thereof, said cam tracks being generally in the shape of the capital letter F positioned upside down and backwards. (See FIG. 23.) The cam tracks 213, 214, 215 in the side plates 212 are oppositely disposed so that together they form a pair of tracks for guiding suitable cam followers downwardly and forwardly with respect to the base 210.

The cam followers 216, 217 are mounted on a movable supporting structure 218 for the forming tool 220 and are four in number, there being two followers for each cam track. Each of the upper cam followers 216 is mounted in a supporting block 219 which extends substantially from one side plate to the other. The forming tool 220 depends from the central portion of the supporting block 221 and is similar to the forming tool previously described in that the tool has a generally circular cross-section and the lower and outer edge 222 of the tool makes an angle of approximately 45° with respect to a horizontal plane so as to provide inwardly curved cam surfaces. Supporting block 219 has parallelly disposed side portions 224 extending downwardly thereof and a pair of similar cam followers 217 are mounted at the lower edges of the side portions in vertical alignment with the upper cam followers 216 and together with the upper cam followers serve to guide the movement of the supporting block 219 in a path downwardly and forwardly with respect to the base 210.

Movement of the supporting structure 218 is effected by the downward movement of a pivotable lever arm or handle 226, mounted on a shaft 228 extending from one side plate 212 to the other. The lever arm 226 is broad and substantially flat and is provided for convenience, with a knob 230 at its outermost end. Adjacent its midportion the arm 226 extends substantially between the parallel side plates 212 and is provided at its side edges with a pair of oppositely disposed downwardly-turned flanges 232. A cross shaft 234 is mounted between the flanges 232 and a pair of linkage arms 236 are connected between the cross-shaft and the lower pair of cam followers 217 on the supporting block 219. Thus, downward pivotal movement of the lever arm 226 will move the supporting block 219 downwardly in the cam tracks 214 until the upper pair of followers 216 are opposite the track 213 and the lower pair of followers 217 are opposite the track 215. Further downward movement of the lever arm 226 then moves the supporting structure 218 forwardly. A spring 235 is connected to a hook 233 on the lever arm 226 and to a crossbar 237 and serves to return the lever arm 226 to its starting position after completion of the operating cycle.

Figure 21:
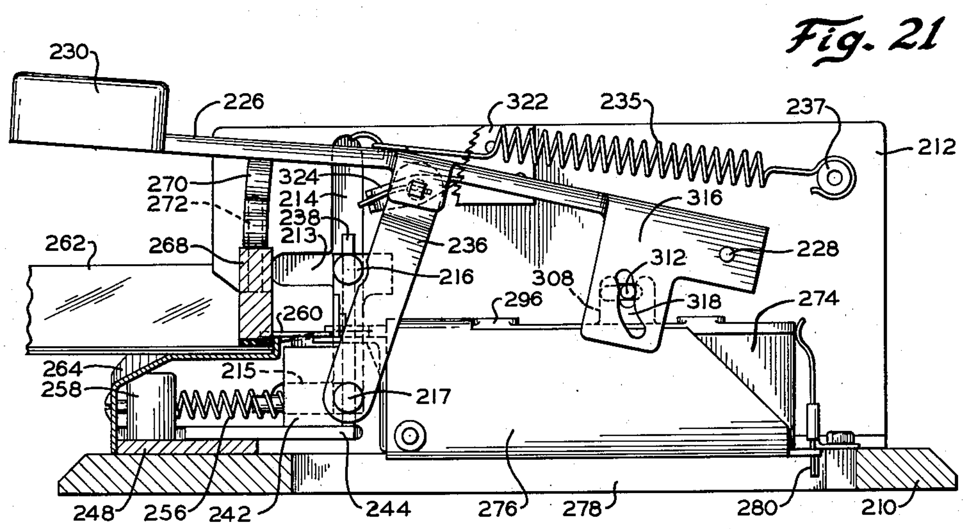
FIGS. 21 and 22 are sequential views with some of the parts omitted for clarity and showing the operation of the various parts of the assembly.
Figure 22:
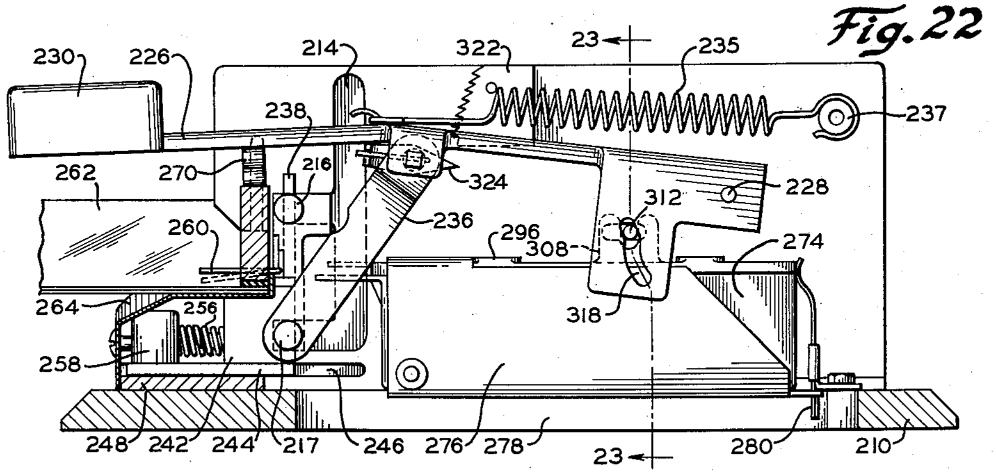
Figure 23:
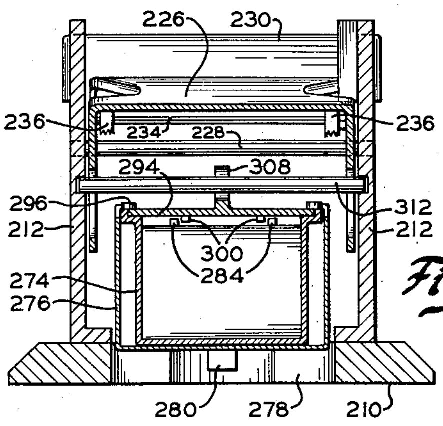
FIG. 23 is a transverse sectional view taken along the line 23—23 of FIG. 22 looking in the direction of the arrows.
Figure 24:
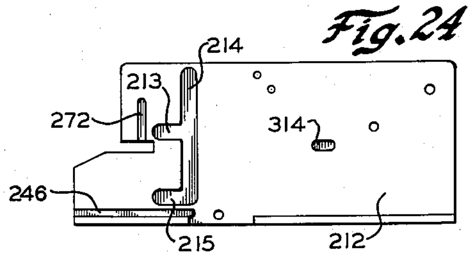
FIG. 24 is an elevational view of one of the side plates showing the grooves formed in the face thereof.
Figure 25:
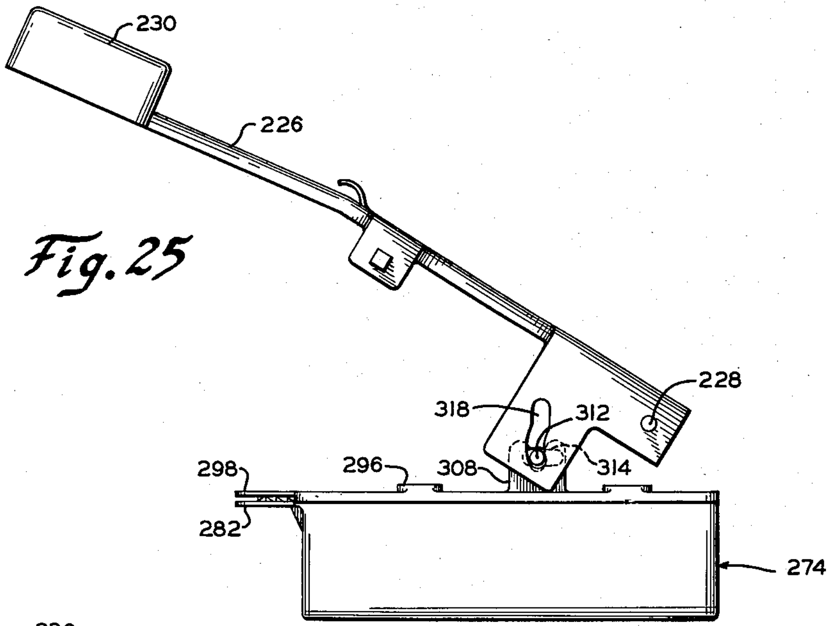
FIGS. 25–27 are sequential views of the lever arm and the container for the clip material showing the interaction of the elements during thhe operating stroke.
Figure 26:
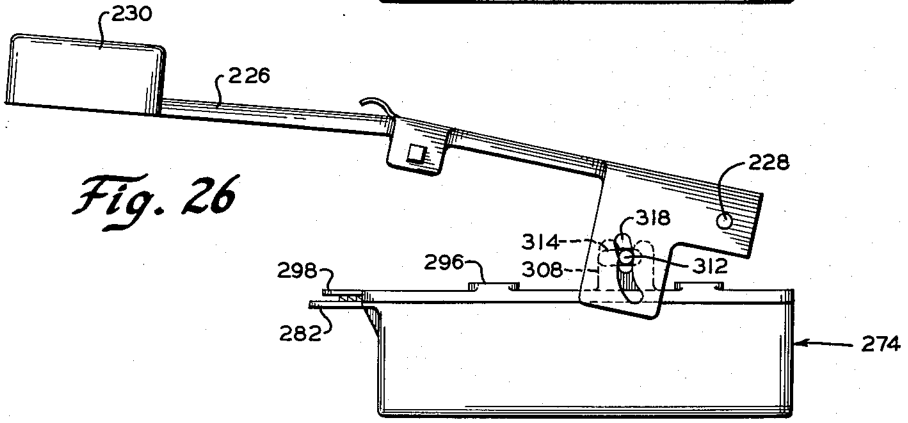
Figure 27:
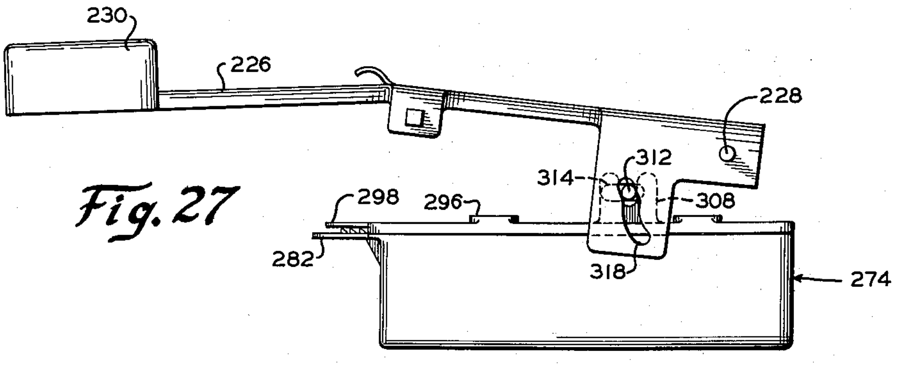
Figure 28:
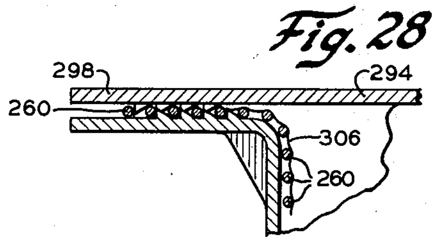
FIGS. 28–30 are sequential views in section showing the actions of the projections and teeth on the cover and the container.
Figure 29:
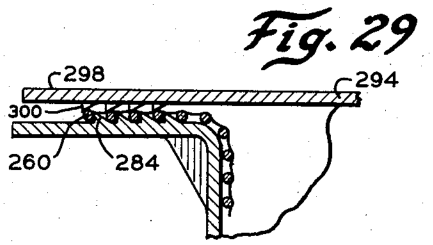
Figure 30:
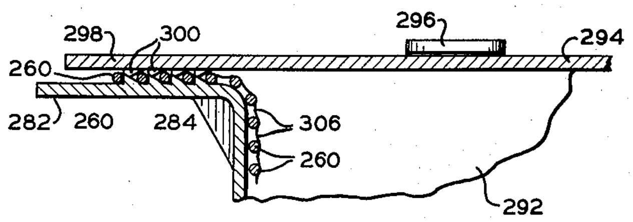
Figure 31:
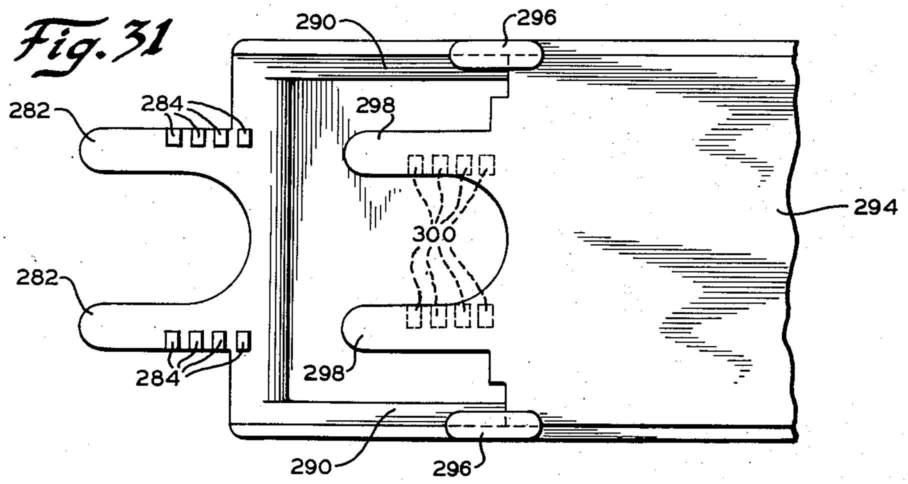
FIG. 31 is a plan view of a portion of the container with the cover partly open.
Figures 32, 33:
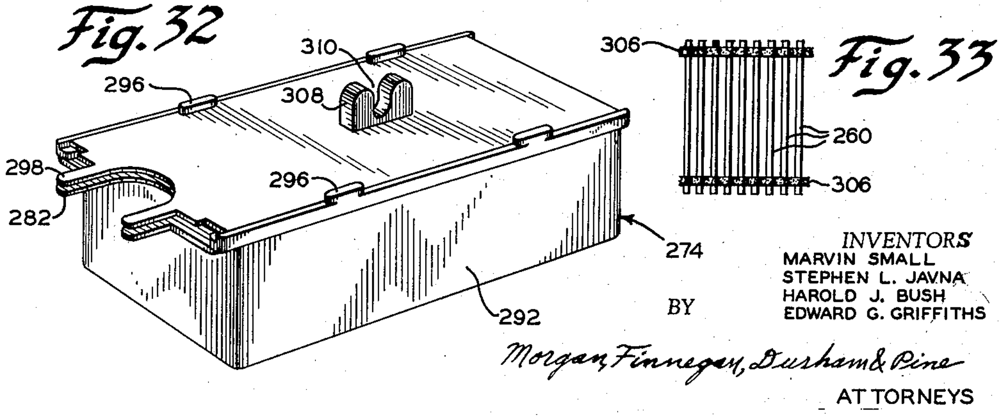
FIG. 32 is a perspective view of the container and cover in postion.
FIG. 33 is a view showing a belt of clip material.

In its downward movement the supporting block 219 guides on a pair of parallel, upwardly extending posts 238 formed on the upper corners of the guide plate 240. The guide plate 240 is secured to the mandrel block 242 which is, in turn, secured to a plate 244 laterally movable in oppositely disposed grooves 246 formed adjacent inwardly turned flanges 248 at the front portions of the side plates 212, said flanges 248 serving as bedplates for the movable plate 244. Positioned in the mandrel block 242 are the vertically movable mandrel 250—about which the pin is formed—the mandrel guide 252 and the mandrel housing 254. These parts are similar to those described above and the cooperation of these parts with the forming tool 220 for the formation of a clip is the same as is shown in FIGS. 9–14. After the wire rod 260 is bent into a clip around the mandrel 250, the mandrel block 242 and plate 244 are moved forwardly with and by the supporting block 219 bearing against the posts 238 upon which the supporting block guides. This movement is best shown in FIGS. 21 and 22 and is accomplished against the force of a return spring 256 mounted between the front of the mandrel block 242 and a stationary post 258 fixed in the base 210. At the forming of the clip the ends of the rod 260 were passed over and under the papers 262 or other articles to be fastened together as described previously and as the clip is moved forwardly with the mandrel block it is forced onto the articles which rest on the inclined surface 264 of the cover casing 266; the articles being held against movement by the slidable pressure plates 268 secured to the lever arm handle 226 by the spring 270 and mounted in the grooves 272 in the side plates 212.

Unlike the previously described embodiment the container 274 for the clip material, or wire rods 260, from which the clips are formed, is positioned adjacent the base 210 in a pivotable carrier 276. Access to permit insertion and removal of the container 274 is provided by a suitable opening 278 in the base and the carrier and the container are held in operative position by a spring latch 280 on the base adjacent the rearward end of access opening 278.

The container 274 is preferably substantially rectangular in shape with an open top and is formed from plastic, light gauge metal or other suitable material. At its forward end the container is provided with a pair of parallel, forwardly extending arms or projections 282 and at the side edge of each of the projections there are a number of teeth 284. The teeth on the projections on the container are formed with a substantially straight front face and with a sloping or slanted rear face and the teeth 284 are spaced from one another a sufficient distance to accommodate the wire rods 260. The container 274 is provided with a pair of grooves 290 at the upper edges of the side members 292 into which a slidable cover plate 294 may be inserted. A plurality of lugs 296 are formed on the container 274 and extend above and inwardly of the container to retain the cover 294 in the grooves 290. The cover 294 is shaped to correspond to the container 274 and also has a pair of forwardly extending parallel projections 298 coinciding with the projections 282 on the container so that when the cover is inserted in the grooves 290 these projections 298 lie above the projections 282 on the container 274. Projections 298 have a plurality of teeth 300 formed therein, said teeth 300 being positioned inwardly of the teeth 284 on the projections 282. These teeth 300 are also shaped with straight forward faces and sloping rear faces. Each of the projections 282, 290 on the container 274 and cover 294 are sufficiently long to extend forwardly of the guide plate 240 when the container is in its operative position so as to lie immediately adjacent the mandrel housing 254.

Clip material in the form of wire rods 260 are joined together at properly spaced intervals by means of a plastic binder 306 applied to their end portions, or in any other suitable manner, so as to form a belt of rods in a manner similar to a cartridge belt. The feeding of the wire rods 260 out of the container 274 and into a position adjacent the mandrel 250 is accomplished by relative reciprocal movement between the cover 294 and the container 274. Initially, the first few wire rods 260 of the belt are placed in the teeth 282 on the container 274. The cover 294 is then inserted on the container 274 and the teeth 300 on the cover 294 help maintain the wire rods between the teeth 282. Cover 294 is provided with an upstanding lug 308 having a recess 310 through which there passes a cross-shaft 312 mounted for short lateral movement within a pair of oppositely disposed and very short grooves 314 in the side plates 212. Additionally, the lever arm handle 226 adjacent its rearward end is provided with a pair of downwardly extending brackets 316 at its side edges and each of these brackets 316 is provided with a cam track 318 through which the cross-shaft 312 passes. The cam track 318 is so shaped that as the lever arm 226 is first pivoted downwardly, the cross-shaft 312 is moved in a rearwardly direction. This, in turn, causes the lug 308 and the cover 294 to be moved rearwardly and the teeth 300 on the projection 298 on the cover 294 to pass rearwardly over the wire rods 260 so that the first tooth 300 falls between the second and third rods. Thereafter no movement of the cross-shaft 312 or the cover 294 for the container 274 takes place during the downward stroke of the lever arm 226. As the lever arm is released on its upward return stroke—and just before it reaches the end of its upward stroke—the cross-shaft is moved forwardly in the grooves and this forward movement moves the lug and cover forwardly to advance the next wire rod into operative position. At the next downward stroke of the lever arm the cover cap is retracted to fit between the next wire rod and the cycle of operation repeated. Severance of the wire rods, one from the other, is effected by a pair of knives 320 mounted on the supporting block 219 which cut the binder 306 between the rods on the downward stroke of the supporting block.

In order that proper feeding of the wire rods 260 takes place it is necessary that each downward stroke of the lever arm 226 be a complete stroke because the reciprocal feeding action of the teeth 284 and 300 takes place as the lever arm is first depressed and also during the last portion of its return stroke. If a complete stroke is not made each time it will result in more than one wire being bent during the next stroke. Accordingly, a ratchet 322 is provided on one side plate 212 and a pawl 324 is mounted on the link 236. A spring 326 tends to maintain the pawl in a fixed position. The teeth on the ratchet will permit the pawl to slide thereover on the downward stroke of the lever arm 226 but will prevent the pawl and lever arm from moving upward after only a partial stroke (FIG. 21). On the return after a complete stroke the pawl 324 is bent so as to ride over the teeth by abutment with the lower edge 328 of the ratchet 322.

The invention in its broader aspects is not limited to the specific mechanisms described but departures may be made therefrom within the scope of the accompanying claims without departing from the principles of the invention and without sacrificing its chief advantages.

What is claimed is:

1. A clip forming and fastening device comprising means for holding and feeding a supply of clip material, a mandrel, a movable forming tool adapted to engage the length of clip material fed thereto and to bend it around the mandrel, means for moving the terminal ends of said length of clip material out of normal coplanar relationship during the bending thereof to form a clip having superposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for disengaging said formed clip from around said mandrel, and means for moving the formed clip laterally toward said articles to effect application of said formed clip to the articles to be fastened.

2. A clip forming and fastening device comprising means for holding a supply of clip material, a mandrel mounted on a movable base, feed means for positioning a length of clip material adjacent the mandrel, a downwardly movable forming tool mounted on the movable base for engagement with the length of clip material to bend it around the mandrel, means for moving the terminal sections of said length of clip material relatively vertically during the bending thereof to form a clip having opposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for disengaging said formed clip from around said mandrel and means for moving the base toward said articles to effect application of the formed clip to the articles to be fastened together.

3. A clip forming and fastening device as set forth in claim 2 having means for converting the downward movement of the tool into lateral movement of the base.

4. A clip forming and fastening device comprising means for receiving and holding in position articles to be fastened together, means for holding a supply of clip material, a mandrel mounted on a movable base, feed means for positioning a length of clip material adjacent the mandrel, a downwardly movable forming tool mounted on the movable base for engagement with the length of clip material to bend it around the mandrel to form a clip having opposed sections, means for disengaging said formed clip from around said mandrel, and means for moving the base laterally toward said articles to apply the clip to the articles to be fastened together, the receiving means for the articles to be fastened being adapted to hold the edges of the articles at an angle with respect to the plane of the clip and adjacent the mandrel so that one end of the length of the clip material passes over the articles while the opposite end of the length of clip material passes under the articles as the clip is formed.

5. A clip forming and fastening device comprising means for holding a supply of clip material, a mandrel mounted on a movable base, feed means for positioning a length of clip material adjacent the mandrel, a downwardly movable forming tool mounted on the base for engagement with the length of clip material to bend it around the mandrel, means on said mandrel for effecting movement of the terminal sections of said length of clip material out of normal co-planar relationship to form a clip having superposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for normally holding the base against movement, first means on the downwardly movable forming tool for overcoming said holding means at the end of the clip forming stroke of the tool, second means on said tool disengaging said clip from around said mandrel, said tool mounting means constructed and arranged for effecting lateral movement of the base to apply the formed clip to the articles to be fastened.

6. A clip forming and fastening device comprising means for receiving and holding in position articles to be fastened together, means for holding a supply of clip material, a mandrel mounted on a laterally movable base, feed means for positioning a length of clip material adjacent the mandrel, a forming tool pivotally mounted on the base for engagement with the length of clip material to bend it around the mandrel, cam means on said mandrel for moving the terminal sections of said length of clip material relatively vertically to form a clip having superposed leg sections, stop means for normally holding the base against movement, means on the pivoted forming tool for engaging and releasing the stop means at the end of the clip-forming stroke of the tool, means for disengaging said clip from around said mandrel, a support member for said base, a lever arm pivotally connected to the support, and a connecting link between said lever and the pivoted forming tool whereby the pivotal movement of the lever causes pivotal movement of the forming tool to form the clip and lateral movement of the base toward said articles at the end of the clip-forming stroke of the tool to apply the formed clip to the articles to be fastened.

7. A clip forming and fastening device comprising means for receiving and holding in position articles to be fastened together, means for holding a supply of clip material, a mandrel mounted on a laterally movable base, feed means for positioning a length of clip material adjacent the mandrel, a forming tool pivotally mounted on the base for engagement with the length of clip material to bend it around the mandrel to form a clip having opposed sections, stop means for normally holding the base against movement, means on the pivoted forming tool for engaging and releasing the stop means at the end of the clip-forming stroke of the tool, a support member for said base, a lever arm pivotally connected to the support, and a connecting link between said lever and the pivoted forming tool whereby the pivotal movement of the lever causes pivotal movement of the forming tool to form the clip and lateral stroke of the tool to apply the clip to the articles to be fastened, and means on said forming tool for depressing the mandrel prior to the lateral movement of the base so as to permit the clip to be applied to the articles to be fastened.

8. A clip forming and fastening device comprising a mandrel, pivotally mounted forming tool, means on the pivoted forming tool for holding a supply of clip material, a feeding member for the clip material mounted for relative movement with respect to the pivoted forming tool and adapted to receive a length of clip material from said supply means, means for moving the feeding member toward the mandrel as the forming tool is pivoted so as to place a length of clip material adjacent the mandrel, said length of clip material thereafter being engaged by the forming tool and bent around the mandrel, means for effecting movement of the terminal sections of said length of clip material out of normal co-planar relationship to form a clip having superposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for disengaging said clip from around said mandrel, and means for laterally moving the formed clip toward the articles to apply said clip thereto.

9. A clip forming and fastening device comprising means for receiving and holding in position articles to be fastened together, a mandrel, a pivotally mounted forming tool, means on the pivoted forming tool for holding a supply of clip material, a feeding member for the clip material mounted for relative movement with respect to the pivoted forming tool and adapted to receive a length of clip material from said supply means, means for moving the feeding member toward the mandrel as the forming tool is pivoted so as to place a length of clip material adjacent the mandrel, said length of clip material thereafter being engaged by the forming tool and bent around the mandrel to form a clip having opposed sections, means for disengaging said formed clip from around said mandrel, and means for laterally moving the formed clip toward said articles to apply the clip to the articles to be fastened together, the receiving means for the articles to be fastened together being adapted to hold the edges of the articles at an angle with respect to the plane of the clip and adjacent the mandrel so that one end of the length of clip material passes over the articles while the opposite end of the length of clip material passes under the articles as the clip material is bent around the mandrel.

10. A clip forming and fastening device as set forth in claim 8 having the mandrel mounted on a laterally movable base to which the forming tool is pivotally connected, said clip material feeding member being pivotally connected to the base at a point spaced from the pivot point of the forming tool so as to move the feeding member relative to the forming tool upon pivotal movement thereof.

11. A clip forming and fastening device comprising a mandrel, a pivotally mounted forming tool, means on the pivoted forming tool for holding a supply of clip material, a feeding member for the clip material mounted for relative movement with respect to the pivoted forming tool and adapted to receive a length of clip material from said supply means, means for moving the feeding member toward the mandrel as the forming tool is pivoted so as to place a length of clip material adjacent the mandrel, said length of clip material thereafter being engaged by the forming tool and bent around the mandrel to form a clip having opposed sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for disengaging said formed clip from around said mandrel, and means for laterally moving the formed clip toward said articles to apply the clip to the articles to be fastened together, said mandrel being mounted on a laterally movable base to which the forming tool is pivotally connected, and said clip material feeding member being pivotally connected to the base at a point spaced from the pivot point of the forming tool so as to move the feeding member relative to the forming tool upon pivotal movement thereof.

12. A clip forming and fastening device as set forth in claim 11 in which one end of the feeding member is provided with an opening adapted to accommodate the mandrel and a groove adjacent the opening to receive a length of clip material whereby pivotal movement of the feeding member past the mandrel deposits the length of clip material adjacent thereto.

13. A clip forming and fastening device comprising means for holding a supply of clip material, a mandrel, feed means for positioning a length of clip material from said supply means adjacent the mandrel, a downwardly movable forming tool adapted to engage the clip material and to bend it around the mandrel, means for moving the terminal sections of said length of clip material relatively vertically during the bending thereof to form a clip having superposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means on the forming tool for disengaging the formed clip from around said mandrel and means for moving the formed clip laterally toward said articles to apply the clip to the articles to be fastened.

14. A clip forming and fastening device comprising means for receiving and holding in position articles to be fastened together, means for holding a supply of clip material, a mandrel, a laterally movable base supporting said mandrel, feed means for positioning a length of clip material from said supply means adjacent the mandrel, a downwardly movable forming tool adapted to engage the clip material and to bend it around the mandrel to form a clip having opposed sections, means on the forming tool for disengaging the mandrel from said formed clip, and means for laterally moving the tool and base toward said articles to apply the clip to the articles to be fastened, the receiving means for the articles to be fastened being positioned ajacent the mandrel and adapted to hold the edges of the articles at an angle to the plane of the clip whereby one end of the length of clip material passes over the articles while the opposite end passes under the articles during the clip forming operation.

15. A clip forming and fastening device comprising means for receiving and holding in position articles to be fastened together, means for holding a supply of clip material, a mandrel, feed means for positioning a length of clip material from said supply means adjacent the mandrel, a downwardly movable forming tool adapted to engage the clip material and to bend it around the mandrel to form a clip having opposed sections, means on the forming tool for disengaging the mandrel from said formed clip, and means for laterally moving the formed clip toward said articles to apply the clip to the articles to be fastened, said mandrel including a central core having an annular casing formed around the core at a distance so as to define an annular opening therebetween to accommodate the forming tool and said disengaging means comprising a movable portion of the casing connection to the core so that when the tool engages the movable section the core is also moved downwardly.

16. A clip forming and fastening device comprising a support, a laterally movable base mounted on the support, a mandrel mounted on the base, a forming tool pivotally mounted on the base, means on the forming tool for holding a supply of clip material, a clip material feeding member slidably engaged with the forming tool and adapted to receive a length of clip material, a lever arm pivoted at one end to the support, a plurality of connecting links pivotally connected to both the lever arm and the pivoted forming tool, at least one of said connecting links adapted, upon pivotal movement of the lever arm to move said feeding member forward to place a length of clip material adjacent the mandrel and, at the same time said links being constructed and arranged, to move the forming tool, upon movement of said lever arm, downwardly into engagement with the length of clip material so as to bend it around the mandrel to form a clip having opposed sections, means for disengaging said formed clip from around said mandrel, stop means on said support for holding the base against lateral movement, means on said support for receiving and holding in position articles to be fastened together, and means on the forming tool for engaging and releasing the stop means at the end of the clip forming stroke said links operative upon further pivotal movement of the lever arm to laterally move the base toward said articles for applying said formed clip to the articles to be fastened together.

17. A clip forming and fastening device as set forth in claim 16 having means for depressing the mandrel after the clip has been formed to permit the clip to be applied to the articles to be fastened together.

18. A clip forming and fastening device comprising a frame, a lever arm pivotally connected to the frame, a base on the frame laterally movable with respect thereto and provided with a mandrel, means for positioning a length of clip material adjacent the mandrel, a forming tool pivotally mounted on the base for engagement with the length of clip material to bend it around the mandrel, at least one cam face on said mandrel for moving the terminal section of said length of clip material relatively vertically to form a clip having superposed leg sections, means on the frame for receiving and holding in position articles to be fastened together with the edges thereof to be fastened disposed adjacent said mandrel, said cam face being operative to dispose said leg sections with said edges of the articles to be fastened positioned therebetween, means connecting said forming tool to the lever arm for movement therewith, means for disengaging said formed clip from around said mandrel, and means for converting the pivotal movement of the lever arm into lateral movement of the base upon completion of the clip-forming stroke of the forming tool whereby said formed clip is moved toward and applied to said articles to be fastened.

19. Clip forming means comprising a downwardly movable mandrel, a stationary mandrel guide positioned around the mandrel, a mandrel housing positioned around said guide but spaced therefrom to form an opening therebetween, said mandrel housing adapted to receive a length of clip material and having a vertical aperture adapted to accommodate a downwardly movable portion connected to the mandrel, a downwardly movable forming tool for engagement with the length of clip material, said forming tool being positioned to pass within the opening between the mandrel guide and the mandrel housing and having upwardly directed and inwardly turned surfaces that engage the length of clip material to bend it around the mandrel to form a clip, and means on the forming tool for engaging the downwardly movable portion of the mandrel upon completion of the clip-forming stroke whereby the mandrel may be downwardly removed from the clip so as to permit withdrawal of the clip from the mandrel housing.

20. Clip forming means as set forth in claim 19 in which the mandrel and mandrel housing are mounted on a laterally movable base and the forming tool is pivoted to said base.

21. A clip forming and fastening device comprising means for holding at least one length of clip material, a mandrel member, means mounting one of said members for movement relative to the other of said members, feed means for positioning a length of clip material from said holding means adjacent the mandrel member, a movable forming tool adapted to engage the length of clip material to bend it around the mandrel member, means for moving the terminal ends of said length of clip material out of normal co-planar relationship during the bending thereof to form a clip having superposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for disengaging said formed clip from around said mandrel, and means for effecting relative movement of said members toward each other after the clip has been formed to effect application of said formed clip to the articles to be fastened.

22. A clip forming and fastening device comprising means for holding at least one length of clip material, a mandrel, feed means for positioning a length of clip material from said clip mandrel holding means adjacent the mandrel, a movable forming tool adapted to engage the length of clip material to bend it around the mandrel, means for moving the terminal ends of said length of clip material relatively vertically during the bending thereof to form a clip having superposed leg sections, means for receiving and holding in position articles to be fastened together with the edges thereof to be fastened disposed adjacent said mandrel, said means for moving the terminal ends of said length of clip material being operative to dispose said leg sections with said edges of the articles to be fastened positioned therebetween, means for disengaging said formed clip from around said mandrel, and means for moving the formed clip laterally toward said articles to effect application of said formed clip to the articles to be fastened.

23. A clip forming and fastening device comprising means for receiving and holding in position articles to be fastened together, means for holding a supply of clip material, a mandrel mounted on a laterally-movable base, laterally-movable feeding means for positioning a length of clip material adjacent the mandrel, a downwardly movable forming tool for engagement with the length of clip material to bend it around the mandrel to form a clip having vertically displaced clipping sections, guide means for confining said base, feeding means and forming tool only to movement as aforementioned, and a pivotable lever arm and link means interconnecting said lever arm to the forming tool and the feeding means whereby the downward pivotal movement of the lever arm is translated into lateral movement of the feeding means to position a length of clip material adjacent the mandrel, downward movement of the forming tool to bend the clip material around the mandrel to form a clip and lateral movement of the mandrel base for placing the clip onto the articles to be fastened together.

24. A clip forming and fastening device as set forth in claim 23 in which the guide means comprise plates having lateral and downwardly extending grooves formed therein and the feeding means, forming tool and mandrel base are provided with extensions fitting within said grooves.

25. A clip forming and fastening device comprising means for receiving and holding in position articles to be fastened together, means for holding a supply of clip material, a mandrel mounted on a movable base, movable feeding means for positioning a length of clip material from said clip mandrel holding means adjacent the mandrel, a downwardly and forwardly movable forming tool on said base and supporting said feeding means adapted to engage the length of clip material to bend it around the mandrel, means for disengaging said mandrel and a clip therearound, a pivotable lever arm connected to the feeding means and the forming tool, and means for translating the pivotal movement of the lever arm into movements of the feeding means, forming tool and base whereby a clip is formed from the clip material with opposed clipping elements and placed onto the articles to be fastened together.

26. The invention as defined in claim 25 wherein the base, tool and mandrel supporting means include plates, each plate being disposed on opposite sides of the forming tool, feeding means and mandrel base, a downwardly extending groove in each side plate, said groove having a pair of parallel and lateral grooves connecting therewith, extensions on the forming tool residing in the said grooves, additional lateral grooves in each side plate, extensions on the mandrel base and the feeding means residing within said grooves, spring means constantly urging the mandrel base in a direction away from the articles to be fastened, and a pivotable lever arm mounted between the side plates and connected to the forming tool and the feeding means whereby pivotal movement of the lever arm causes the feeding means to position a length of clip material adjacent the mandrel, the forming tool to bend the clip material around the mandrel to form a clip having opposed sections, release said formed clip from said mandrel and the base is moved laterally against the force of the spring to place the clip onto the articles to be fastened.

References Cited in the file of this patent

UNITED STATES PATENTS

| | | |
|---|---|---|
| 804,403 | Hoxie | Nov. 14, 1905 |
| 1,897,625 | Svensson | Feb. 14, 1933 |
| 2,222,220 | Binch | Nov. 19, 1940 |
| 2,478,435 | Swenson et al. | Aug. 9, 1949 |
| 2,555,768 | Smith | June 5, 1951 |
| 2,645,543 | Mancini | July 14, 1953 |
| 2,695,208 | Graham | Nov. 23, 1954 |

FOREIGN PATENTS

| | | |
|---|---|---|
| 400,472 | Germany | Aug. 8, 1924 |